United States Patent
Keller (10) Patent No.: US 11,487,516 B2
(45) Date of Patent: Nov. 1, 2022

(54) CROSS-CLOUD CALL DETECTION

(71) Applicant: CITRIX SYSTEMS, INC., Burlington, MA (US)

(72) Inventor: Steven A. Keller, Coral Springs, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/745,218

(22) Filed: Jan. 16, 2020

(65) Prior Publication Data
US 2021/0224048 A1 Jul. 22, 2021

(51) Int. Cl.
*G06F 8/40* (2018.01)
*G06F 11/36* (2006.01)

(52) U.S. Cl.
CPC ............ *G06F 8/40* (2013.01); *G06F 11/3604* (2013.01); *G06F 11/3624* (2013.01)

(58) Field of Classification Search
None
See application file for complete search history.

(56) References Cited

U.S. PATENT DOCUMENTS

| | | | |
|---|---|---|---|
| 10,733,085 B1 * | 8/2020 | Wagner | G06F 11/368 |
| 2018/0107463 A1 * | 4/2018 | Heilbrunn | G06F 21/563 |
| 2018/0288190 A1 * | 10/2018 | Lyons | G06F 8/75 |

* cited by examiner

*Primary Examiner* — Lewis A Bullock, Jr.
*Assistant Examiner* — Mark A Gooray
(74) *Attorney, Agent, or Firm* — Mintz Levin Cohn Ferris Glovsky and Popeo, P.C.

(57) ABSTRACT

Methods and systems are described for cross-cloud call detection. The system may include detecting an instruction configured to call a resource. The instruction may include a name indicative of the resource and one or more values. The resource is configured to construct code using the one or more values. The system may determine the resource is incompatible with a service based on at least the name and the one or more values of the instruction. A conversion of source code is halted when the resource is incompatible with the service.

12 Claims, 8 Drawing Sheets

CROSS-CLOUD CALL DETECTION

TECHNICAL FIELD

The subject matter described herein relates generally to code analysis.

BACKGROUND

Today, the cloud may be used to provide services. For example, the cloud may be implemented on one or more computers coupled to a network, such as the Internet or a private network. The cloud may provide these services on demand. Examples of cloud services include software as a service (SaaS), infrastructure as a service (IaaS), platform as a service (PaaS), and the like. A cloud service may be implemented as a "public cloud" when the cloud service is generally available for public use. Amazon web services and Microsoft Azure are two examples of public cloud services. Alternatively, or additionally, a cloud service may be implemented as a "private cloud," when the services are not publically available. For example, a company or government entity may have a private cloud service available for the organization or its customers.

SUMMARY

Systems, methods, and articles of manufacture, including computer program products, are provided for cross-cloud call detection. In some example embodiments, there is provided a system that includes at least one processor and at least one memory. The at least one memory may store instructions. When executed by the at least one data processor, the instructions may cause the at least one data processor to at least: detecting an instruction configured to call a resource, the instruction including a name indicative of the resource and one or more values, the resource configured to construct code using the one or more values; determining, based on at least the name and the one or more values of the instruction, the resource is incompatible with a service; and halting a conversion of source code derived from the resource, the resource being incompatible with the service.

In some variations, one or more of the features disclosed herein including the following features can optionally be included in any feasible combination. In some implementations, the service is for a private entity and the resource is configured to build an application program interface call functionality capable of making at least one application program interface call to an outside entity. The determining the resource is incompatible with the service may further include identifying the name on a resource list, the resource list including one or more names indicative of incompatible resources with the service. The determining the resource is incompatible with the service may further include determining, based on a quantity of the one or more values, the resource is incompatible with the service. The determining the resource is incompatible with the service may further include comparing a value in the one or more values to an expected value, the expected value linked with the name in a resource list; and determining the value in the one or more values does not match the expected value. In some implementations, the resource comprises at least one of a library, a package, a class, an object, and a function. The system may further include generating, in response to determining the resource is incompatible with the service, at least one of an error for presentation and a suggestion for presentation. In some implementations, the one or more values includes a first storage for at least one credential for access to the service and a second storage for at least a location of the service. In some implementations, the conversion comprises transforming a plurality of instructions from source code to executable code.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer-implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to cross-cloud call detection, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Different computing services may have similar functions but with distinct security and privacy requirements. Functions may be accidentally integrated into a computing service despite failing to meet security requirements. For instance, the Microsoft government cloud service may have stricter security requirements than the Microsoft commercial cloud service. API call functions are used in both Microsoft commercial cloud services and Microsoft government cloud services. If a Microsoft government cloud service integrates an API call function originally developed for a Microsoft commercial cloud service, this API call function may expose the government cloud service to outsiders. The use of the commercial API call function compromises the security and privacy requirements of the government cloud service. Thus, methods and systems for cross-cloud call detection are necessary.

Accidental integration of a function may be prevented before a computing service is developed. Code may be examined before compilation and during compilation to determine its functionality once developed. For example, code may be examined to determine its compliance with security and privacy requirements prior to compilation. Security and privacy requirements may also be verified by scrutinizing specific instructions that can invoke an uncompliant function.

In some embodiments, there is provided a system for detecting certain calls, such as cross-cloud calls. The system may comprise, or be comprised in, an analyzer, such as a detector and the like, to scan and detect for code that makes a call, such as a call to a library function, a service, or other resources. The library, service, or other resource may include a behavior or mechanism configured to be reusable by multiple different programs. In some embodiments, the analyzer performs the scan as part of compilation while the code is compiled into executable code. The analyzer may scan the code at other times as well.

To illustrate further, code may include an instruction corresponding to a call to a library function. This library may contain a function, but the function may fail to meet certain security requirements. For example, the analyzer may scan the code to detect the instruction "ComputeManagementClient( . . . )." Based on the instruction, the analyzer may determine that the instruction is configured to call a library function named "ComputeManagementClient." The analyzer may further determine, based on the library function name, that the library is prohibited for a government computing service. Thus, the name "ComputeManagementClient" indicates a prohibited library function will be called. This determination may be performed by comparing the library name to a preconfigured list. This list may identify the prohibited library functions by name. The library function names may be included on the prohibited list for a variety of reasons, including security requirements.

In some embodiments, the analyzer may not be able to determine whether the instruction "ComputeManagementClient(Credentials)" is prohibited solely based on the library function name, but instead must evaluate parameters associated with the instructions, such as "Credentials." This is because compliant and non-compliant library functions may share the same library function name, such as "ComputeManagementClient." Similarly, the analyzer may not be able to determine whether the instruction is configured to call the right library function based solely on the name "ComputeManagementClient."

To overcome this problem, the analyzer may further evaluate the parameters associated with the instruction, such as the "Credentials" parameter. The analyzer may determine a legitimate library function is called when the instruction includes two values, namely "Credentials" and "baseUri." Because the instruction "ComputeManagementClient(Credentials)" includes only a single value—"Credentials"—the analyzer determines "ComputeManagementClient(Credentials)" is a prohibited instruction. Once the prohibited instruction is detected, the analyzer may flag the instruction "ComputeManagementClient(Credentials)" as prohibited and prevent the instruction from being compiled for the government service cloud. The value may represent a parameter. The parameter may be in the form of a value, for example.

Figure 1:
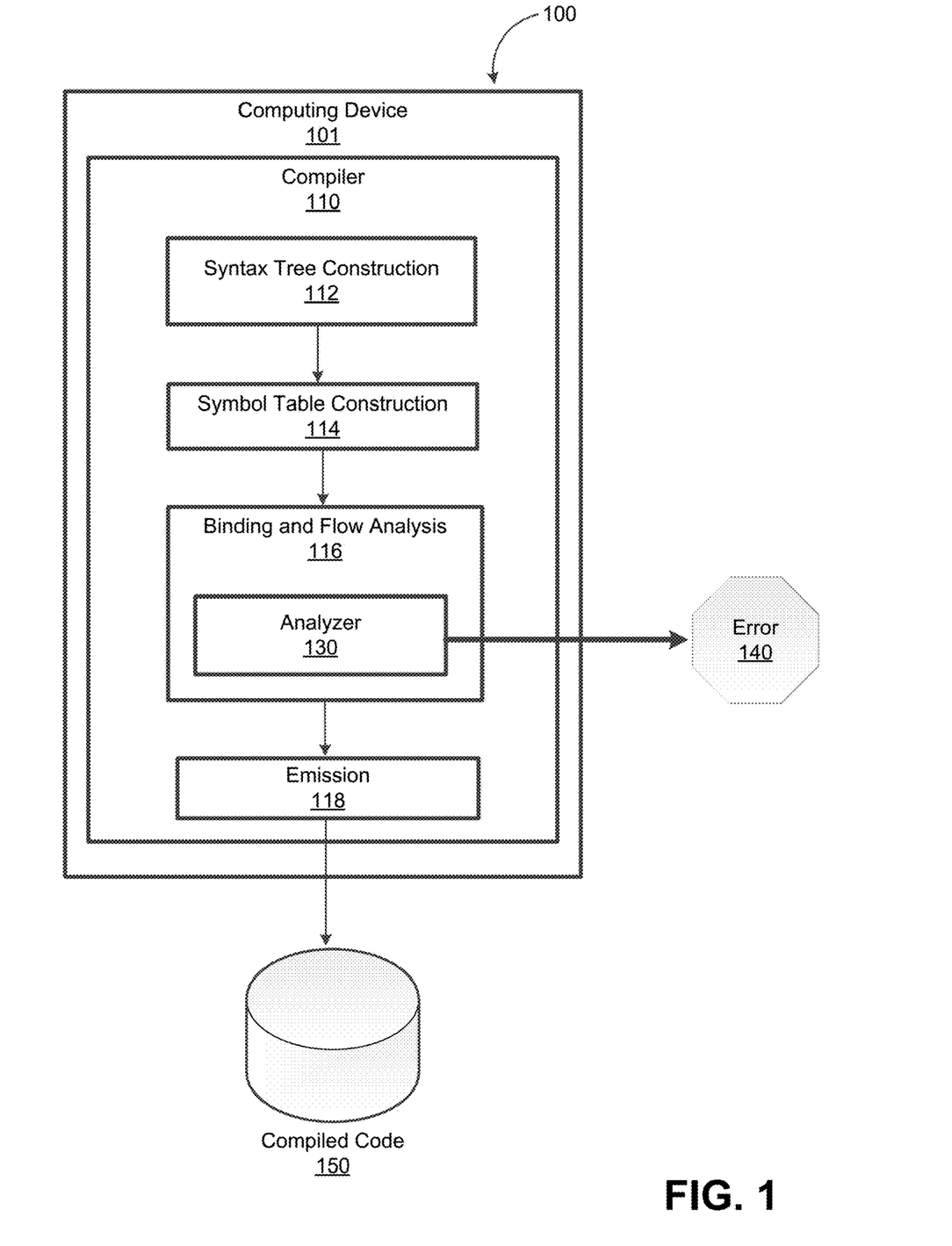
FIG. 1 depicts an example of a compiler system configured to analyze code functionality, in accordance with some example embodiments.

FIG. 1 depicts an example of a compiler system 100 configured to verify code compatibility, in accordance with some example embodiments. The compiler 110 may translate code, such as source code, into compiled code, such as executable code. The process may include syntax tree construction 112, symbol table construction 114, binding and flow analysis 116, and an emission 118. The analyzer 130 may be included as part of the binding and flow analysis 116. The analyzer may also be applied during other times or included in other components. The compiler 110 may operate on a computing device 101.

The compiler 110 may process instructions written in a programming language and translates them into an executable code which can be executed by a processor at the computing device 101 or at any other computing device. The computing device 101 may be a server, a computer desktop, a mobile device, and/or the like. The computing device 101 may direct the compiler 110 to a file that contains the instructions. The file containing the instructions may be generated by a code development environment. The instructions may be configured to call a resource. The resource may be an object, a function, a class, a package, or a library that is used to develop the computing service. For example, a library may contain functionality for API calls to be used with the cloud service. The instruction to be compiled by the compiler 110 may call resources, such as objects, functions, classes, packages, or libraries, to develop software designed for a commercial computing service, a government computing service, and/or a foreign computing service. The instructions may be translated into executable code through a multi-stage process. In some embodiments, the compilation instructions may be translated into executable code using a syntax tree, a symbol table, and a binding and flow analysis.

The compiler 110 includes the syntax tree construction 112. The syntax tree is a tree structure including nodes that represents the abstract structure of source code. Each node of the tree structure may denote a construct occurring in the source code. The syntax tree construction provides just the structural or logical details of the source code. Syntax tree construction 112 may aid the compilation process by ordering the executable statements and may ensure that the executable statements are well defined and represented. Syntax tree construction 112 may also ensure the components of binary operations are stored and correctly defined.

Further, syntax tree construction 112 may also ensure the organization and storage of identifiers and assigned values before reaching assignment statements.

The symbol table construction 114 creates a symbol table. The symbol maintains and tracks the semantics of variables by storing scope and binding information of identifiers. Each Individual identifier (or variable) is associated with information relating to the declaration or appearance in the source code. The compiler 110 may use at least a single symbol table for all symbols. The compiler 110 may use hierarchal symbol tables for varying scopes. Variables or declarations may have unique identifiers. Symbol table construction determines the scope of different declarations or variables. Symbol table construction may achieve compile-time efficiency by organizing the declarations and variables. The symbol table construction may rely on the information synthesized by the syntax tree construction 112 to identify the scope and binding information of identifiers.

The binding and flow analysis 116 may be an optimization technique for determining relevant and useful information about a program at build time. The binding and flow analysis 116 examines the logical flow of data and optimizes the logical flow by organizing the definition points (e.g., x=8), reference points (e.g., y=x), and evaluation points (e.g., "ComputeManagementClient(Credentials)" in a cohesive manner. For example, the binding and flow analysis may examine when the instructions call the resource. The binding and flow analysis 116 may rely on the information synthesized by the syntax tree construction 112 and the symbol table construction 114 to determine an optimal time and manner for having the instruction call the resource.

For the program code being compiled, the emission 118 writes instructions or executable code, based on the syntax tree construction 112, the symbol table construction 114, and the binding and flow analysis 116. In other words, the output of the emission 118 may be executable code, such as machine code, assembly code, or other types of code executable by a processor. For example, the output of the emission 118 may be a hexadecimal code readable by the processor. The emission 118 may rely on the information generated by the syntax tree construction 112, the symbol table construction 114, and the binding and flow analysis 116 to generate the executable code. The executable code may have various functionalities that can be carried out by a processor, such as making an API call.

The compiled code 150 may be the output of the compiler 110. The compiled code 150 may be machine-readable code, assembly code, executable script, or other types of code executable by a machine, such as a processor. The compiled code 150 may be included in a function associated with the computing service. For example, the compiled code 150 may be used to make API calls to or from the cloud service. A mobile device may make an API call to a Microsoft commercial service to authenticate a recently installed application with user credentials on the mobile device.

The analyzer 130 may flag instructions configured to call a prohibited resource. The analyzer 130 may seek and identify instructions to call a resource (e.g., objects, calls, functions, packages, classes, libraries) that is prohibited. For example, a prohibited instruction may not be suitable or may not be compatible with a given computing service. As noted above, the analyzer 130 may detect an instruction capable of making a prohibited API call after the instruction is compiled. For example, a prohibited API call may occur if, for example, a private cloud service makes a call to a public server exposing sensitive information of the private cloud service. The analyzer 130 may allow the compiler 110 to continue compilation, so long as no prohibited instructions or resources are detected. In other words, the analyzer 130 enables the compiler 110 to continue compiling source code so long as the instructions and resources are legitimate (e.g., not prohibited) for development with a given computing service. For example, if an instruction is configured to build a function prohibited by the computing service, the compiler 110 may flag the instruction calling the prohibited resource so it can be deleted or revised to be compatible with the computing service. The compiler 110 may send an error to a user interface explaining that a prohibited resource was called by an instruction. The compiler 110 may halt the compilation to prevent the prohibited resource to create a prohibited function for the target computing service.

In some embodiments, the analyzer 130 may verify code compatibility with the computing service at build time. To verify code compatibility, the analyzer 130 may evaluate the name of a library function and values associated with the library. For example, the name may identify a library while a value may include parameters associated with the library or the computing service. For example, the values may represent URIs, URLs, credentials, and other types of data. The analyzer 130 may determine whether the instruction is compatible with the computing service based on examining an instruction name and/or value(s) associated with the instruction against a list of legitimate libraries.

The analyzer 130 may receive source code, from a compiler 110, that includes an instruction to be compiled during the code compilation process. Alternatively, and/or additionally, the analyzer 130 may scan the source code for instructions to be compiled during the code compilation process. The analyzer 130 may also receive a resource list, from a compiler 110, that names instructions that may potentially call a prohibited resource. For example, the resource list may provide the names of resources, such as a library name. These named resources may build functions failing to meet security or privacy requirements for a given computing service. As a result, the resource may be considered incompatible. The received resource list may also include expected values, arguments, and/or parameters associated with the resource names.

The analyzer 130 may detect instructions configured to call a resource that builds an incompatible function with the computing service. The analyzer 130 may detect instructions calling prohibited resources by using a text-search function to match an instruction name to a prohibited library name.

In some embodiments, the purpose of the analyzer 130 may be to identify instructions that, when compiled, have API call functionalities capable of making improper calls to other servers and/or computing services. The analyzer 130 may determine the instruction requires editing to avoid building executable code with improper API call functionalities. These instructions requiring editing are determined based on a name and/or value(s) associated with the code.

As noted above, the analyzer 130 may detect an instruction reading "ComputeManagementClient(Credentials)." The instruction may include the resource name, "ComputeManagementClient." The resource name is compared against a list of prohibited resources. The comparison may determine the list includes the name of the resource (e.g., "ComputeManagementClient"). Accordingly, the resource "ComputeManagementClient" may be a prohibited resource.

The analyzer 130 may be unable to determine whether the resource is prohibited from the name alone. In such cases, the analyzer 130 may use a value list or a parameter list to make additional comparisons to determine if the instruction utilizes a permissible format associated with the resource name. For example, the list may indicate the resource is not prohibited if the library function name, "ComputeManagementClient," includes the Credentials and baseUri parameters. In this example, the instruction "ComputeManagementClient(Credentials)" does not contain the required parameters as defined in the list. As a result, the analyzer 130 may determine the instruction "ComputeManagementClient (Credentials)" calls a prohibited resource. In this example, the analyzer 130 may generate an error 140 indicating the instruction "ComputeManagementClient(Credentials)" calls a prohibited resource because the resource functionality is not compatible with the target computing service (e.g., due to security, privacy, or other factors). The analyzer may provide the error 140 to a user interface for presentation at a display of an editor or other types of code development system. Alternatively, or additionally, the error 140 may cause a halt—such as a pause, break, stop, or a suspending— in the code compilation process, so that the prohibited instruction "ComputeManagementClient(Credentials)" can be deleted or corrected before being compiled for the target computing service. The analyzer 130 may signal to the compiler 110 that an incompatible resource, such as the prohibited ComputeManagementClient(Credentials), is being called.

Although the analyzer 130 is depicted in the binding and flow analysis 130, the analyzer 130 may be included in other components or configured for other phases of the compilation process performed by the compiler 110. For example, the analyzer 130 may instead operate to detect resources (which are prohibited or incompatible with a computing service) outside the compiler 110 or a compilation process. For example, the analyzer 130 may operate in a code development system configured for developing source code. Alternatively, or additionally, the analyzer 130 may be provided as a service, a plug-in, or a package that interfaces with the compiler 110 or a code development system.

The analyzer 130 may be considered more than a code check (which focuses on how the code is written). A generic code check will inspect code to determine if there are any inherent issues. In contrast, the analyzer 130 anticipates and determines whether the end functionality of the compiled code will include prohibited calls or other functions that may cause security, privacy, or other risks to a given computing service. The analyzer 130 may thus address the problem of ensuring data integrity and privacy by determining whether the resource called by the instruction is compatible with the target computing service. The analyzer 130 may examine the underlying resource's compatibility with the target computing service, rather than just how a code statement is written (e.g., the syntax and the components of the code statement). In addition to the described functionality, the analyzer 130 may inspect any aspect of the code, including variables, functions, language, comments, and/or the like.

Figure 2:
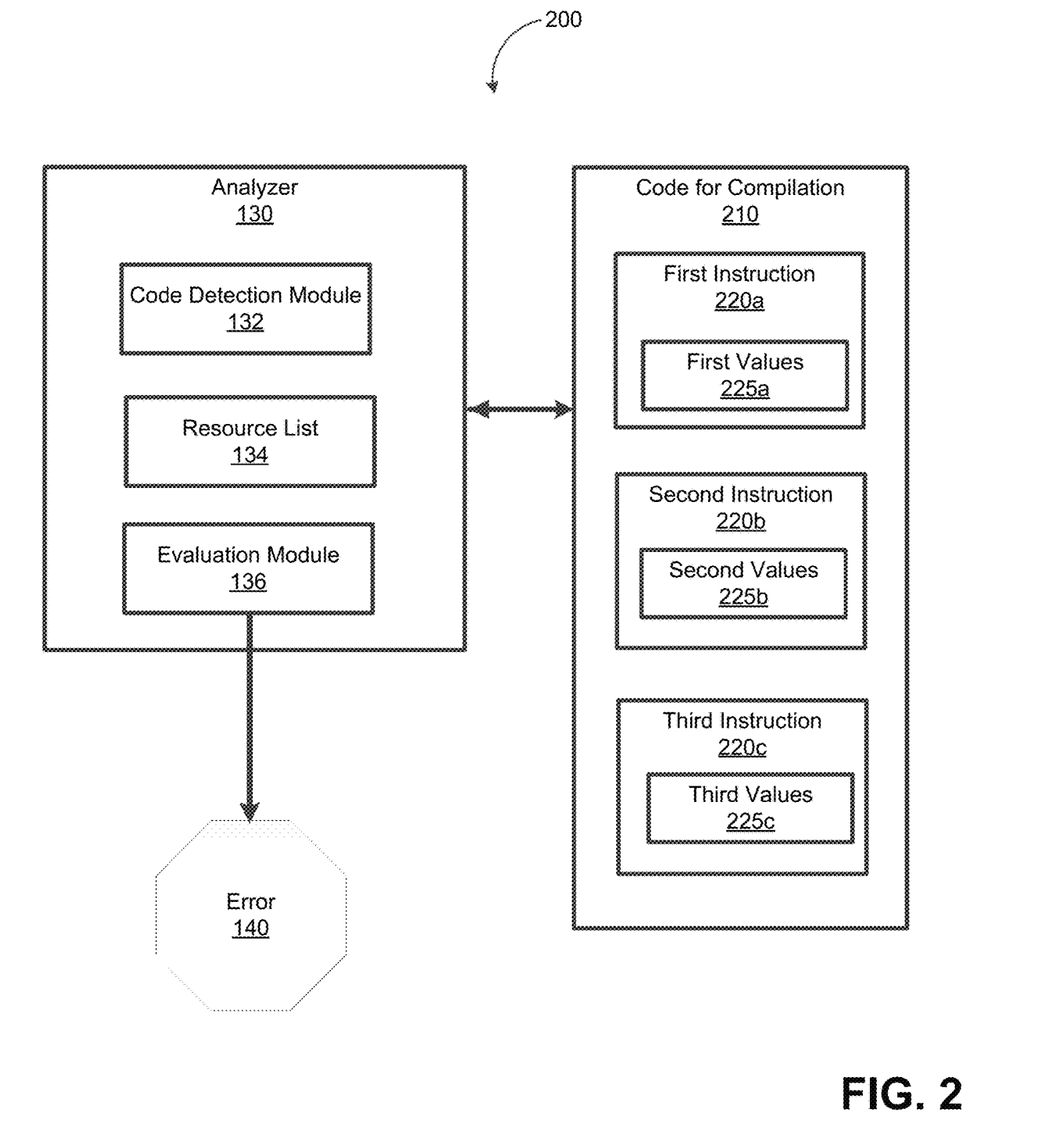
FIG. 2 depicts the analyzer configured to examine instructions in accordance with some example embodiments.

FIG. 2 depicts an example implementation of an analyzer configured to examine instructions, in accordance with some example embodiments. FIG. 2 is similar to FIG. 1 in some respects but further includes the code for compilation, the code for compilation being acted upon by the analyzer 130.

The analyzer 130 may include a code detection module 132, a resource list 134, and an evaluation module 136. The code for compilation 210 may include a first instruction 220a, a second instruction 220b, and a third instruction 220c.

The code detection module 132 may scan the code for compilation 210 to detect the first instruction 220a, the second instruction 220b, and the third instruction 220c. The code detection module 132 may detect the first instruction 220a, the second instruction 220b, and the third instruction 220c prior to the actual compilation of the code. The code detection module 132 may determine whether the first instruction 220a calls a coding resource of interest. For example, the analyzer 130 may scan the code to detect the instruction "ComputeManagementClient( . . . ). Based on the instruction, the analyzer 130 may determine that the instruction is configured to call the resource named "ComputeManagementClient." "ComputeManagementClient" is a resource of interest as it is configured to build a function incompatible with the target computing service.

When the code detection module 132 detects the first instruction 220a, the code detection module 132 may check the first instruction 220a against a resource list to determine if the resource builds a function failing to maintain a security standard (i.e., incompatible) for the target computing service. For example, a resource list may include the name "ComputeManagementClient." In this example, all resources named "ComputeManagementClient" are configured to build functions potentially failing to meet the security requirements of a target computing service. The resources named "ComputeManagementClient" may be configured for a commercial computing service. If the resource "ComputeManagementClient" is called during the compilation of code for a government computing service, a prohibited function will be included in the government computing service. The analyzer 130 compares the resource name to a resource list to determine whether the resource name is associated with the resource incompatible with the target computing service.

The code detection module 132 may be configured to detect instructions including a function name and a list of values. The code detection module 132 may be configured to detect the instruction based on the values associated with the instructions. For example, the code detection module 132 detects an instruction "ComputeManagementClient(Credentials)," where the name is ComputeManagementClient and the value is "Credentials." The code detection module 132 determines the instruction calls a resource due to the parameter value in the parentheses following "ComputeManagementClient." The parentheses may be configured to hold values configured to construct code by the resource. The code detection module 132 may detect the type of resource that is being used by the instruction by examining the resource name of the instruction. For example, the code detection module 132 may scan the code until detecting the instruction "ComputeManagementClient( . . . )." Based on the instruction, the code detection module 132 determines that the instruction is configured to call a resource named "ComputeManagementClient." The analyzer may determine, based on the library name, the code calls a prohibited resource for the target computing service, such as a private or a government computing service. The government computing service may have higher security requirements when compared to a public computing service. The code detection module 132 may further determine whether the instruction is prohibited based on the parameter values associated with the instruction. In this situation, the code detection module 132 evaluates the parameter values in the parentheses ("Credentials") and determines the instruction is configured to call a prohibited resource.

The resource list 134 may include a list of one or more resources prohibited for development with a given target computing service. Alternatively, the resource list 134 may include only those resources sanctioned for use with the given target computing service. The resource list may include those prohibited resources originally developed for a commercial computing service. If the prohibited resource is called during the compilation of code for a government computing service, a prohibited function will be included in the government computing service. The code detection module 132 is configured to use the resource list 134 to determine which instructions are configured to call prohibited or incompatible resources. For example, the code detection module 132 may use the resource list 134 to compare the resource names associated with the instructions. The code detection module 132 may check the resource list 134 in response to detecting an instruction. If the resource list 134 contains the resource name associated with the instruction, the code detection module 132 may perform additional actions to determine if the coding resource is configured to build a function falling below a security requirement for the target computing service. For example, the code detection module 132 may not be able to determine whether the instruction is configured to call the right library function based on the name "ComputeManagementClient." In this situation, the code detection module 132 evaluates the parameter values in the parentheses ("Credentials") and determines if the value fails to match the expected values. The code detection module 132 may determine the resource called by the instruction is incompatible based on the name associated with the instruction.

The evaluation module 136 may evaluate an instruction if the analyzer 130 determines the instruction may potentially call a resource incompatible with the target computing service. Based on a quantity of parameter values associated with the instruction, the evaluation module 136 may determine whether the resource called by the instruction is prohibited, such as a resource building a commercial function for a government computing service. Referring to our previous example for the "ComputeManagementClient(Credentials)," the code detection module 132 may determine, based on the name of the library resource and the parameter value "Credentials," fails to match an expected pattern, that the resource called by the instruction is incompatible with the target computing service.

The code for compilation 210 includes the first instruction 220*a*, the second instruction 220*b*, and the third instruction 220*c*. The first instruction 220*a*, the second instruction 220*b*, and the third instruction 220*c* may include first values 225*a*, second values 225*b*, and third values 225*c*, respectively. The first instruction 220*a*, the second instruction 220*b*, and the third instruction 220*c* may include a name (e.g., a resource name) and parameter values enclosed by parentheses. For instance, the parameter values may be enclosed by a set of parentheses in the first instruction 220*a*. The resource name may be placed in front of the parentheses containing the values.

The first values 225*a*, the second values 225*b*, and the third values 225*c* may include numerical values, strings, objects, a Boolean value, integers, arrays, linked lists, trees, or an enumerated type. The first values 225*a*, the second values 225*b*, and the third values 225*c* may be used by the coding resource to construct code. The first values 225*a*, the second values 225*b*, and the third values 225*c* may be parameters or arguments to be passed to the resource to construct code.

The first values 225*a*, the second values 225*b*, and the third values 225*c* may form the structure of the API call signature for the compiled code. A pre-compilation API signature may inform the compiler 110 and/or the analyzer 130 whether a parameter value is compatible with a resource. Additional parameter values of the pre-compilation API signature may indicate which computing service the resource is compatible with. In at least one embodiment, the pre-compilation API signature with fewer parameters may indicate the resource is incompatible with the target cloud service.

The analyzer 130 may determine the resource constructs API call functionality failing to match a profile corresponding to the target computing service. Elements of the profile may include a signature or metadata. The analyzer 130 may determine that the instruction does not match a profile based on a name, a value, an argument, and/or a parameter associated with the instruction. The analyzer 130 may determine the resource fails to match a profile corresponding to the computing service by determining that the instruction invoking the resource includes an incorrect number of values or parameters. For example, an expected number of parameters for the profile is two while the instruction provides only one. The analyzer 130 may determine the resource does not match a profile corresponding to the target computing service by determining the coding parameters— including a naming parameter and a placement parameter— do not correspond to the target computing service.

Figure 3:
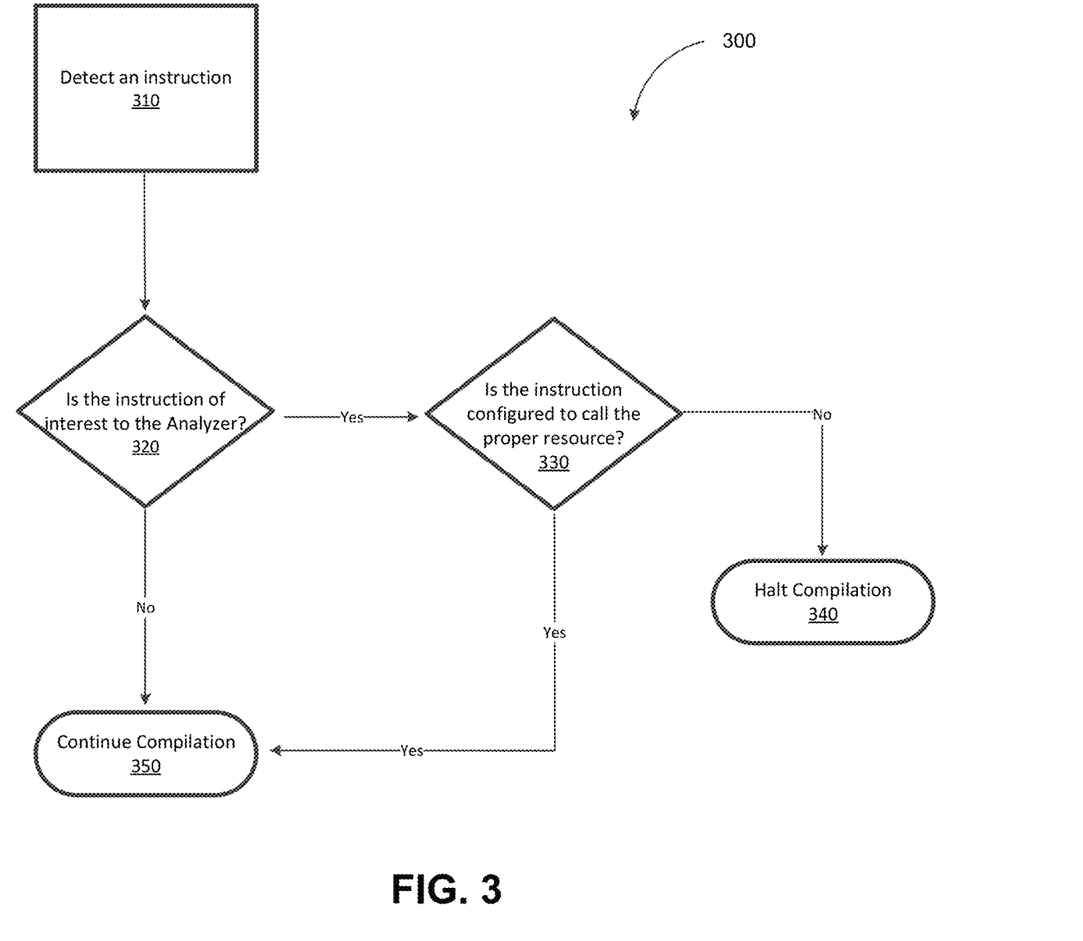
FIG. 3 depicts a process for the analyzer, in accordance with some example embodiments.

FIG. 3 depicts a flow process 300 for the analyzer 110, in accordance with some example embodiments.

At 310, analyzer 130 may detect an instruction configured to call a resource. The instruction may include a name indicative of the resource and one or more values. The resource may be configured to construct code using the one or more values. The resource may be an object, a functionality, a class, a package, or a library, which builds a function for the target cloud-based service, such as an API call functionality. For example, the analyzer 130 may scan the code until detecting the instruction "ComputeManagementClient( . . . )." Based on the instruction, the analyzer determines that the instruction is configured to instantiate a library class named "ComputeManagementClient." The library class "ComputeManagementClient" may be configured to build an API call.

At 320, the analyzer 130 may determine whether the instruction is of interest. The analyzer 130 may determine the instruction is of interest based on the name associated with the instruction. The analyzer 130 may determine whether the instruction is compatible with the computing service based on at least a name. To determine whether the instruction is of interest, the analyzer 130 may use the resource list 134 to check whether the resource name associated with the instruction appears on the list. If the resource list 134 contains the resource name associated with the instruction, the analyzer 130 may perform additional actions to determine if the coding resource is compatible with the target computing service. In some embodiments, the resource name is of interest if at least two resources with the same resource name exist. If the instruction is of interest, then the analyzer 130 may perform, at 330, additional actions to determine if the coding resource is compatible with the target computing service. If not, the instruction is compiled at block 350.

At 330, the analyzer 130 may determine whether the instruction is configured to call the proper resource for the target computing service. In some embodiments, the analyzer 130 uses the parameter values associated with the instruction to determine that the resource is incompatible with the service. This determination may be made based on at least the quantity of parameters (which are associated with the instruction) matching a pattern or a predefined format. The analyzer 130 determines the resource called by the instruction of interest is incompatible by comparing a parameter value in the one or more parameters to an expected value. The expected value may be linked with the resource name in a resource list 134. If the value and the expected value do not match, the analyzer 130 determines the resource called by the instruction is incompatible with the target computing service, proceeding to block 340. For example, the analyzer 130 detects the instruction "ComputeManagementClient(Credentials))." The analyzer 130 may not be able to determine whether the instruction is configured to call the right resource based on the name "ComputeManagementClient." In this situation, the analyzer 130 evaluates the parameter values in the parentheses (e.g., "Credentials"). For example, to call the correct library, the analyzer 130 expects to see two parameters, the two parameter values provided by the resource list 134. The analyzer quantifies the parameters (e.g., "Credentials") and determines there is only one. When the analyzer determines the number of parameters does not match the expected number of parameters (e.g., two parameters), the logic of the analyzer 130 proceeds to 340. If the quantity of parameters matches with the expected parameters, the logic of the analyzer 130 proceeds to block 350.

At 340, the analyzer 130 instructs compiler 110 to at least refrain from further compilation, interrupts the compiler 110, or flag the instruction calling the prohibited resource. For example, the compilation process may be halted after determining the instruction calls a prohibited resource. After 340, the analyzer may instruct the compiler 110 to halt the compilation.

At 350, the analyzer 130 may instruct compiler 110 to continue compiling. For example, if the compiler 110 was paused and/or halted to further examine the instruction calling the resource, the compiler 110 may continue to the next instruction in the program code.

Figure 4:
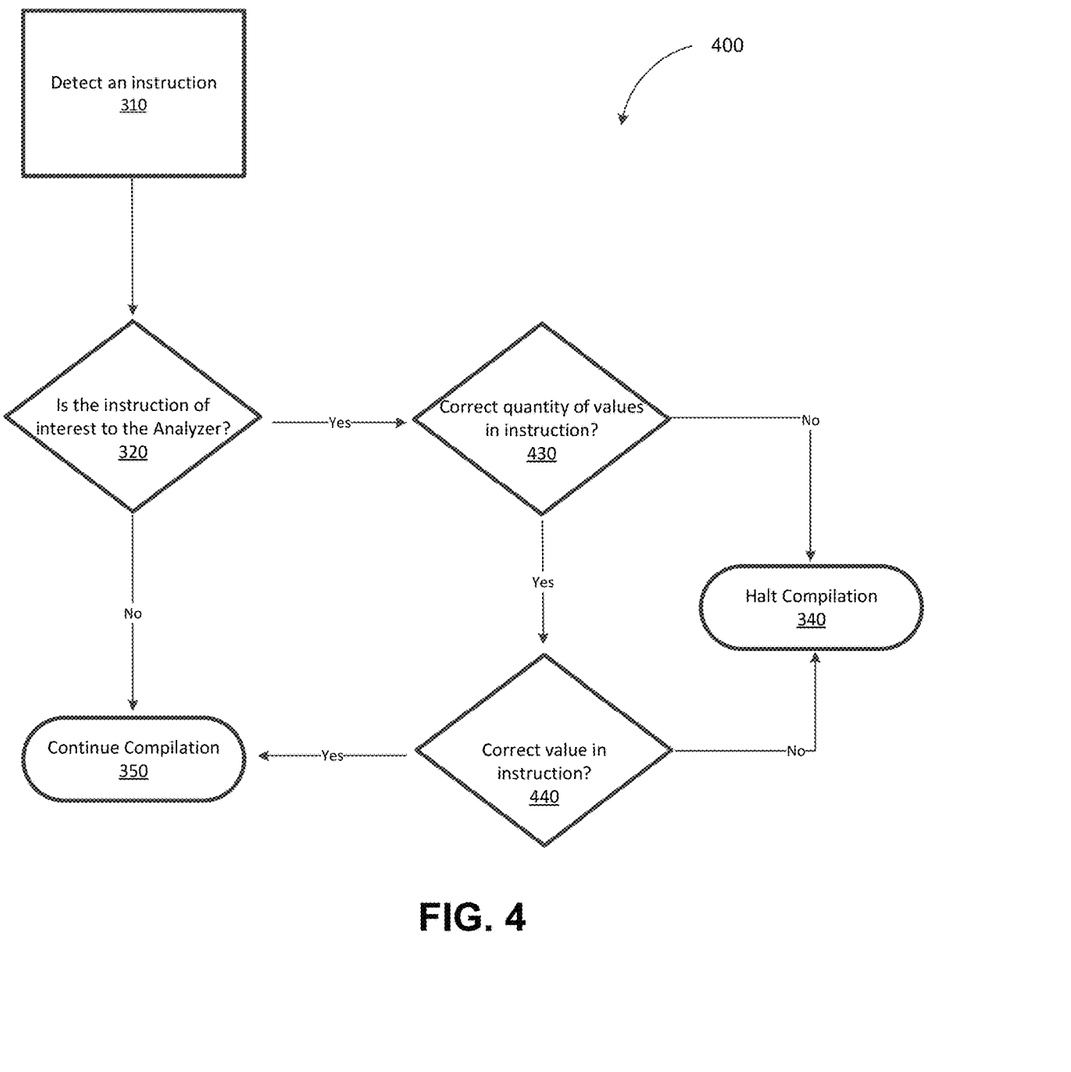
FIG. 4 depicts another process for the analyzer, in accordance with some example embodiments.

FIG. 4 depicts another process for the analyzer, in accordance with some example embodiments. FIG. 4 is similar to FIG. 3 in some respects but analyzes the instruction in two separate steps. The process 400 may be used to determine whether an object, class, package, library, or other resource is compatible with a target computing service.

At block 430, the analyzer 130 may determine whether the instruction is configured to call the proper resource for the target computing service based on the quantity of values within the code for compilation. As noted, the analyzer 130 may use the parameter values associated with the instruction to determine the resource is incompatible with the service. This determination may be made based on at least the quantity of values parameters associated with the instruction. If the correct number of parameters is provided for the compatible resource, the logic of the analyzer 130 proceeds to block 440. If the incorrect quantity of parameters is provided, the logic of the analyzer 130 proceeds to block 340. Alternatively, and/or additionally, compiler 110 may determine whether the instruction provides the correct quantity of parameters to call the proper resource for the target computing service at block 440.

At block 440, the analyzer 130 may determine whether the instruction is configured to call the proper resource for the target computing service based on the correct parameter value. In at least one embodiment, the analyzer 130 determines the resource called by the instruction of interest is incompatible by comparing a value in the one or more parameters to an expected value. The expected value may be linked with the resource name in a resource list 134. If the value and the expected value do not match, the analyzer 130 determines the resource called by the instruction is incompatible with the target computing service, proceeding to block 340. If the value and the expected value do match, the logic of the analyzer 130 proceeds to block 350.

Figure 5A:
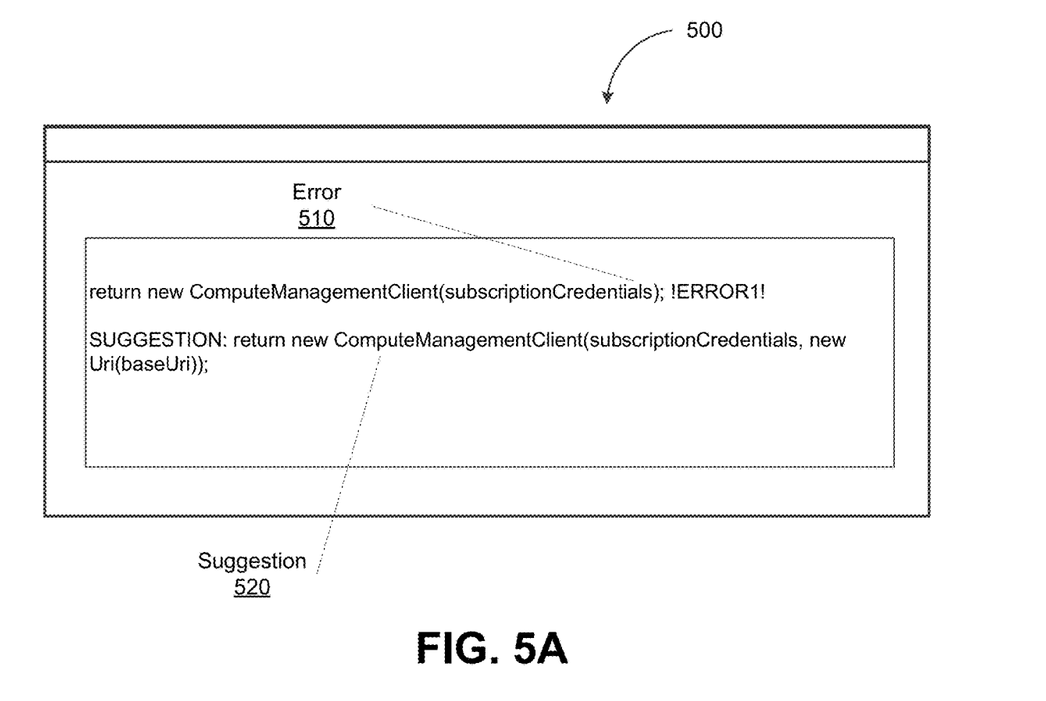
FIG. 5A depicts a user interface including a suggestion generated by the analyzer, in accordance with some example embodiments.

FIG. 5A depicts an example of a code development interface 500. The user interface may be generated by a system, such as code development system, an editor, or an integrated development environment (IDE). The user interface shows an example of a suggestion generated by the analyzer 110. The code development system may provide a static code analyzer that detects errors in the code and, in particular, instructions calling incompatible resources. The code development system may direct a compiler to operate in the background as source code is received. The source code may invoke a resource that relates to the functionality of a computing service. The resources of the code development system may be inadvertently included in the development of commercial, government, or foreign computing services. For example, a commercial function may be inadvertently included in a foreign cloud service. In another example, a government function may be inadvertently included in a commercial cloud service.

The analyzer 130 may be integrated into a code development system, such as an integrated development environment, to verify code compatibility with a computing service. For example, the analyzer 130 may be integrated into Eclipse® or VisualStudio®. The analyzer 130 may provide a suggestion 510 for editing source code in the code development system. The code development system may detect a resource that was potentially developed for another computing service. If so, the code development system 500 may provide the code including the instruction associated with the API call to the analyzer 130, so the analyzer 130 can determine whether the resource is compatible with the cloud service. The analyzer 130 in the code development system may be a plug-in for a compiler running in the background of the code development system. The suggestion 510 may be provided by the code development system. The code development system coupled to or including the analyzer 130 may also be enabled for plugins to analyze code in real-time. The code development system may compile code in the background. The code development system may notify the user that the analyzer has determined the compiled code in the background comes from an illegitimate or incompatible library. In at least one embodiment, the code development system may provide a suggestion 510 to the user as the code is being developed.

The suggestion 510 may provide guidance for altering the inputted code to make the code compatible with the target computing service. The suggestion 510 may also provide the user with an alternative resource compliant or compatible with the intended computing service. For example, the suggestion can provide the name and values of the resource for the government computing service if the name and values of the commercial resource were provided. The code development system may consume the analyzer 130 in the background, enabling the analyzer 130 to detect design characteristics and provide a suggestion 510.

Figure 5B:
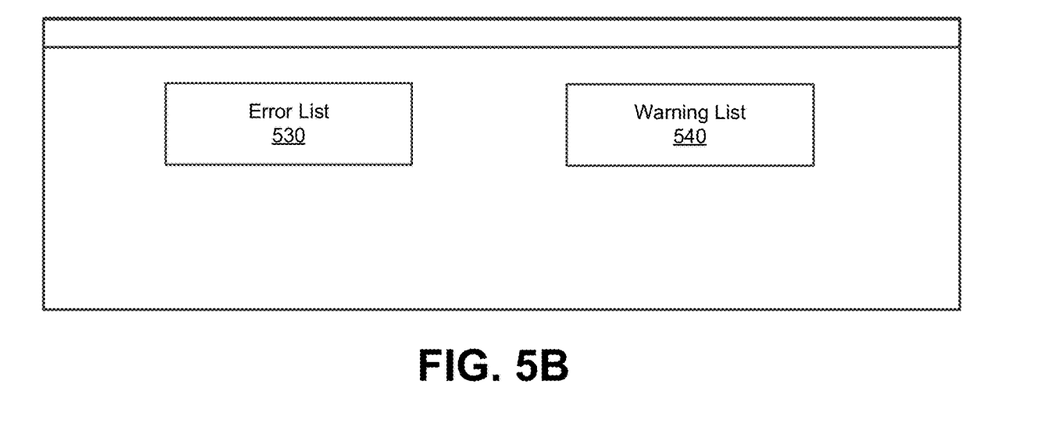
FIG. 5B depicts an error list and a warning list, in accordance with some example embodiments.

FIG. 5B depicts an error or a warning list generated by the code development system populated by an analyzer, in accordance with some example embodiments. A compiler may be included in the code development system with a programming software package. The code development system compiler running in the code development system 500 may operate substantially similar to compiler 110.

The analyzer 130 may operate during the compile process or in the code development system. The code development system 500 may generate warnings or errors based on the logic of the analyzer 130. The error may be placed in error list 530, and the warnings may be placed in a warning list 540. Before the compiling process and while the code is under development, the code development system 500 may enable the analyzer 130 to determine whether an error or a warning should be thrown, indicating a code is not compliant or compatible with the target computing service. The analyzer 130 has the same characteristics and logic, as illustrated in FIGS. 1-4, except the analyzer 130 in the code development system 500 may be a plug-in for a compiler running in the background of the code development system 500.

Figure 6:
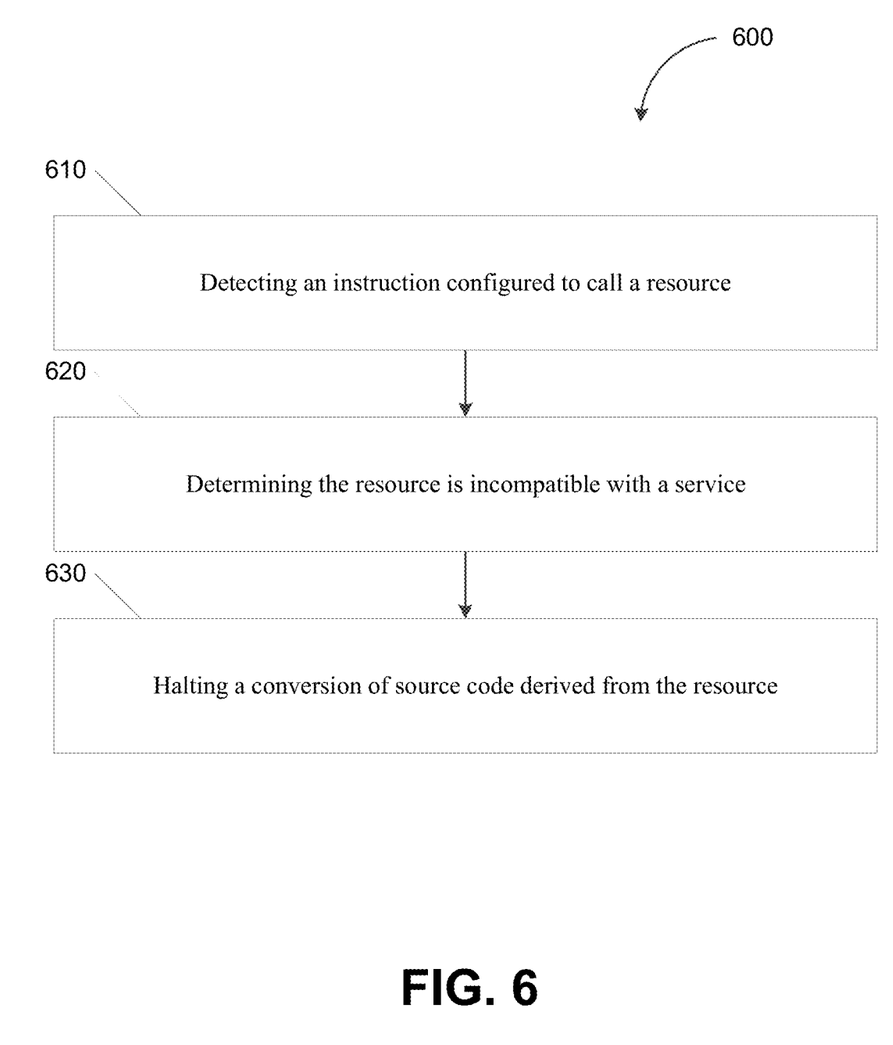
FIG. 6 depicts a process for analyzing code functionality, in accordance with some example embodiments.

FIG. 6 depicts a flowchart illustrating an example of a process for analyzing code functionality with a computing service, in accordance with some example embodiments. For example, At 610, an instruction configured to call a resource may be detected. The instruction including a name indicative of the resource and one or more values. The resource may be configured to construct code using the one or more values. For example, the analyzer 130 may detect an instruction configured to call a resource in code to be compiled using a text search function. The instruction includes a name indicative of the resource and one or more values. The resource may be configured to construct code using the one or more values. In at least one embodiment, the resource constructs API call functionality.

At 620, the analyzer may determine, based on at least the name and one or more values of the instruction, the resource is incompatible with a service For example, the analyzer 130 may determine the instruction is of interest based on the name associated with the instruction. To determine whether the instruction of interest is compatible, the analyzer 130 may use the resource list 134 to check whether the resource name associated with the instruction appears on the list. As noted, the resource list may include the names of resources configured to build functions that fail to meet security or privacy requirements for a given computing service. The analyzer 130 may determine whether the instruction is compatible with the computing service based on at least a name and one or more parameters associated with the instruction.

At 630, the analyzer 130 may halt the compile process when the resource is incompatible with the computing service. Halting the compile process prevents the prohibited resource from being compiled and allows for the editing the instruction to make it compatible. For example, the analyzer 130 may instruct compiler 110 to halt, pause, or interrupt the compilation.

Figure 7:
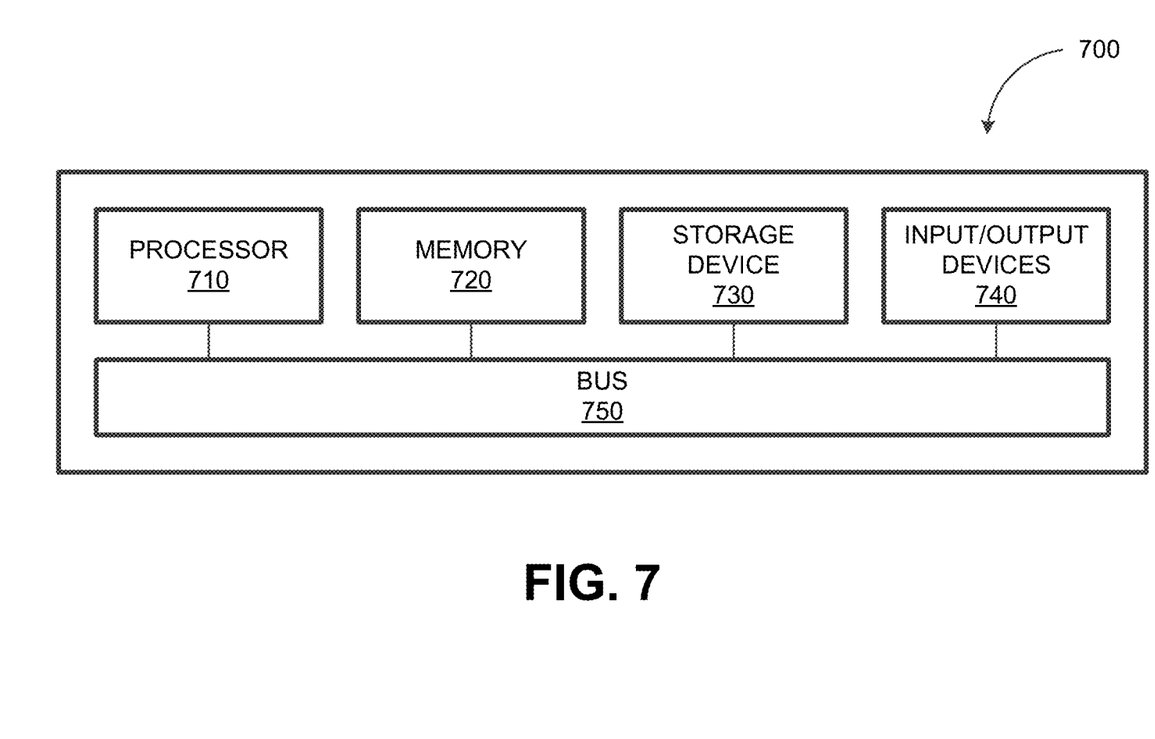
FIG. 7 depicts a block diagram illustrating a computing system, in accordance with some example embodiments.

FIG. 7 depicts a block diagram illustrating a computing system 700 consistent with implementations of the current subject matter. Referring to FIGS. 1-7, the computing system 700 can be used to analyze code functionality before compilation. For example, the computing system 700 may implement a user equipment, a personal computer, or a mobile device.

As shown in FIG. 7, the computing system 700 can include a processor 710, a memory 720, a storage device 730, and an input/output device 740. The processor 710, the memory 720, the storage device 730, and the input/output device 740 can be interconnected via a system bus 750. The processor 710 is capable of processing instructions for execution within the computing system 700. Such executed instructions can implement one or more components of, for example, cross-cloud code detection. In some example embodiments, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer-readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some example embodiments, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 700 can be used to execute various interactive computer software applications that can be used for organization, analysis and/or storage of data in various formats. Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing items and/or functionalities. Upon activation within the applications, the functionalities can be used to generate the user interface provided via the input/output device 740. The user interface can be generated and presented to a user by the computing system 700 (e.g., on a computer screen monitor, etc.).

Figure 8:
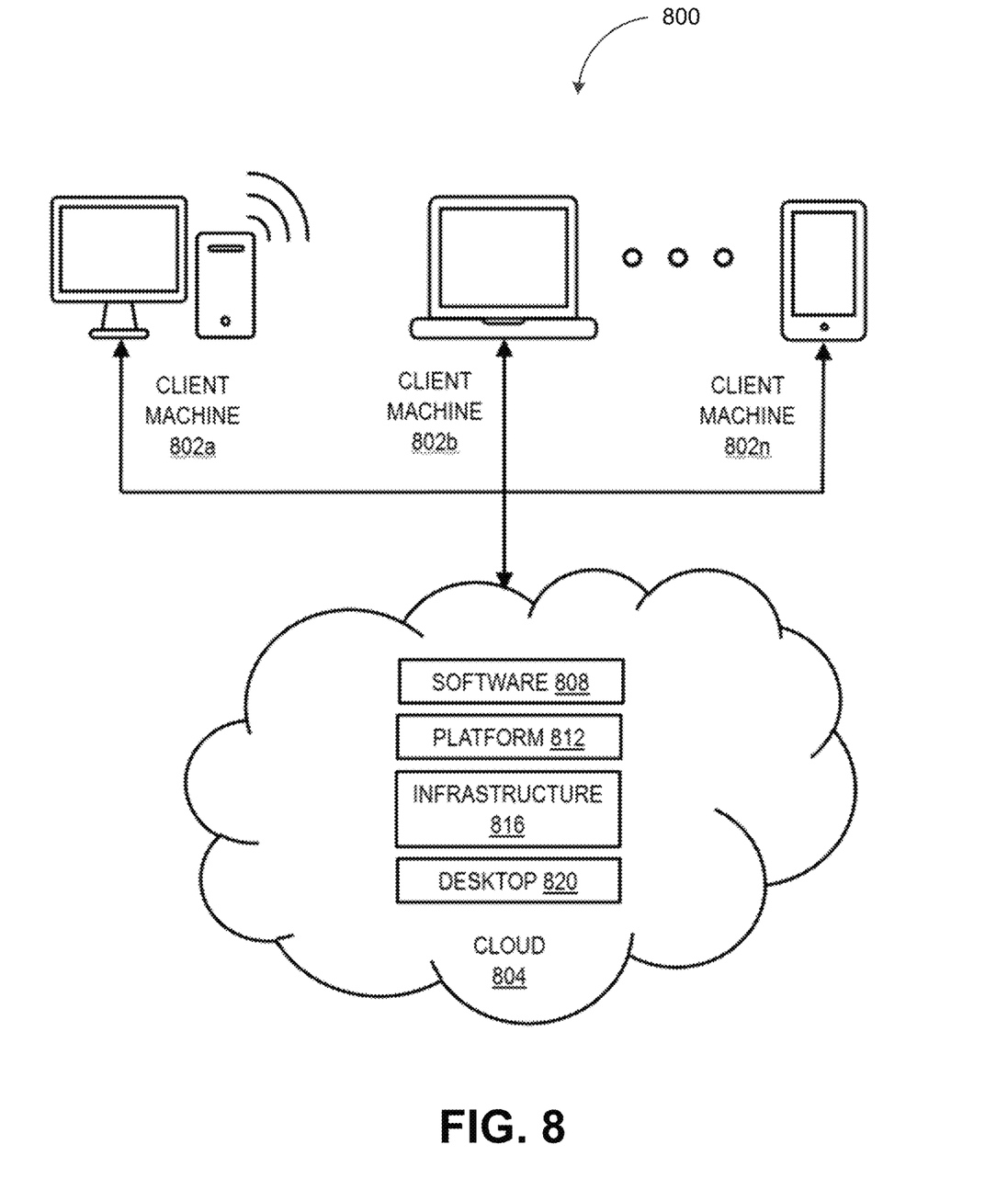
FIG. 8 depicts a block diagram illustrating a cloud computing system, in accordance with some example embodiments.

FIG. 8 is a schematic block diagram of a cloud computing environment. Referring to FIG. 8, a cloud computing environment 800 is depicted, which may also be referred to as a cloud environment, cloud computing or cloud network. The cloud computing environment 800 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 800, one or more clients 802a-802n are in communication with a cloud network 804. The cloud network 804 may include back-end platforms, e.g., servers, storage, server farms or data centers. The users or clients 802a-802n can correspond to a single organization/tenant or multiple organizations/tenants. More particularly, in one example implementation the cloud computing environment 800 may provide a private cloud serving a single organization (e.g., enterprise cloud). In another example, the cloud computing environment 800 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 800 may provide a hybrid cloud that is a combination of a public cloud and a private cloud. Public clouds may include public servers that are maintained by third parties to the clients 802a-802n or the enterprise/tenant. The servers may be located off-site in remote geographical locations or otherwise.

The cloud computing environment 800 can provide resource pooling to serve multiple users via clients 802a-802n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 800 can provide on-demand self-service to unilaterally provision computing capabilities (e.g., server time, network storage) across a network for multiple clients 802a-802n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 800 can provide an elasticity to dynamically scale out or scale in response to different demands from one or more clients 802. In some embodiments, the cloud computing environment 800 can include or provide monitoring services to monitor, control and/or generate reports corresponding to the provided shared services and resources.

In some embodiments, the cloud computing environment 800 may provide cloud-based delivery of different types of cloud computing services, such as Software as a service (SaaS) 808, Platform as a Service (PaaS) 812, Infrastructure as a Service (IaaS) 816, and Desktop as a Service (DaaS) 820, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include Amazon Web Services provided by Amazon.com, Inc., of Seattle, Wash., Rackspace Cloud provided by Rackspace US, Inc., of San Antonio, Tex., Google Compute Engine provided by Google Inc. of Mountain View, Calif., or Rightscale provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google apps provided by Google Inc., Salesforce provided by Salesforce.com Inc. of San Francisco, Calif., or Office 365 provided by Microsoft Corporation. Examples of SaaS may also include data storage providers, e.g., Citrix ShareFile from Citrix Systems, Dropbox provided by Dropbox, Inc. of San Francisco, Calif., Microsoft Skydrive provided by Microsoft Corporation, Google Drive provided by Google Inc., or Apple iCloud provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as Azure Cloud from Microsoft Corporation of Redmond, Wash. (herein "Azure"), or Amazon Web Services provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example, as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light-emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

In the following description, for purposes of explanation, numerous specific details are set forth in order to provide a thorough understanding of the various embodiments. It should be understood that other embodiments may be utilized, and structural changes may be made without departing from the scope of the disclosed subject matter. Any combination of the following features and elements is contemplated to implement and practice the disclosure.

In the description, common or similar features may be designated by common reference numbers. As used herein, "exemplary" may indicate an example, an implementation, or an aspect, and should not be construed as limiting or as indicating a preference or a preferred implementation.

What is claimed is:

1. A system comprising:
    at least one data processor; and
    at least one memory storing program code which, when executed by the at least one data processor, results in operations comprising:
    compiling, by a compiler, source code comprising a plurality of instructions to convert the source code into executable code using a syntax tree, a symbol table, and a binding and flow analysis, wherein during the compilation, the operations further comprise:
        detecting, by the compiler, an instruction of the plurality of instructions, wherein the instruction is associated with a call to a resource comprising a library configured to build a function, and wherein the instruction includes a name indicative of the library and values comprising a credential to access the library and a uniform resource identifier associated with the library;
        determining, by the compiler, whether the instruction is of interest based on the name indicative of the library being included in a resource list;
        responsive to determining that the instruction is of interest, determining, by the compiler, the library is incompatible with a target computing service, wherein the determining the library is incompatible with the target computing service is based on at least the name indicative of the library and the values of the credential and the uniform resource identifier failing to match expected values for the name, the credential, and the uniform resource identifier, the determining further based on the resource list comprising the name indicative of the library linked to the expected values for the name, the credential, and the uniform resource identifier;
        in response to the library being determined as incompatible, halting, by the compiler, processing a conversion of the instruction associated with the call to the resource comprising library and generating and presenting at least one of an error and a suggestion on a user interface; and
        in response deleting or correcting the instruction via the generated and presented user interface, continuing, by the compiler, processing at least one of the conversion of the instruction or another instruction of the plurality of instructions.

2. The system of claim 1, wherein the target computing service comprises a private cloud service, and wherein the library builds an application program interface call to a public server.

3. The system of claim 1, wherein the determining the library is incompatible with the service further comprises:
    identifying the name on the resource list, the resource list including one or more names indicative of incompatible resources with the target computing service.

4. The system of claim 1, wherein the determining the library is incompatible with the target computing service further comprises:

in response to a quantity of the values not matching an expected quantity of the values, determining the library is incompatible with the target computing service.

5. The system of claim 1, wherein the suggestion provides guidance for altering the instruction to make the instruction compatible with the target service.

6. The system of claim 5, wherein the suggestion comprises an alternative library compliant with the target computing service.

7. A method comprising:
compiling, by a compiler, source code comprising a plurality of instructions to convert the source code into executable code using a syntax tree, a symbol table, and a binding and flow analysis, wherein during the compilation, the operations further comprise:
  detecting, by the compiler, an instruction of the plurality of instructions, wherein the instruction is associated with a call to a resource comprising a library configured to build a function, and wherein the instruction includes a name indicative of the library and values comprising a credential to access the library and a uniform resource identifier associated with the library;
  determining, by the compiler, whether the instruction is of interest based on the name indicative of the library being included in a resource list;
  responsive to determining that the instruction is of interest, determining, by the compiler, the library is incompatible with a target computing service, wherein the determining the library is incompatible with the target computing service is based on at least the name indicative of the library and the values of the credential and the uniform resource identifier failing to match expected values for the name, the credential, and the uniform resource identifier, the determining further based on the resource list comprising the name indicative of the library linked to the expected values for the name, the credential, and the uniform resource identifier;
  in response to the library being determined as incompatible, halting, by the compiler, processing a conversion of the instruction associated with the call to the resource comprising library and generating and presenting at least one of an error and a suggestion on a user interface; and
  in response deleting or correcting the instruction via the generated and presented user interface, continuing, by the compiler, processing at least one of the conversion of the instruction or another instruction of the plurality of instructions.

8. The method of claim 7, wherein the target computing service comprises a private cloud service, and wherein the library builds an application program interface call to a public server.

9. The method of claim 7, wherein the determining the library is incompatible with the service further comprises: identifying the name on the resource list, the resource list including one or more names indicative of incompatible resources with the target computing service.

10. The method of claim 7, herein the determining the library is incompatible with the target computing service further comprises:
in response to a quantity of the values not matching an expected quantity of the values, determining the library is incompatible with the target computing service.

11. A non-transitory computer-readable medium comprising instructions which, when executed by at least one processor, cause operations comprising:
compiling, by a compiler, source code comprising a plurality of instructions to convert the source code into executable code using a syntax tree, a symbol table, and a binding and flow analysis, wherein during the compilation, the operations further comprise:
  detecting, by the compiler, an instruction of the plurality of instructions, wherein the instruction is associated with a call to a resource comprising a library configured to build a function, and wherein the instruction includes a name indicative of the library and values comprising a credential to access the library and a uniform resource identifier associated with the library;
  determining, by the compiler, whether the instruction is of interest based on the name indicative of the library being included in a resource list;
  responsive to determining that the instruction is of interest, determining, by the compiler, the library is incompatible with a target computing service, wherein the determining the library is incompatible with the target computing service is based on at least the name indicative of the library and the values of the credential and the uniform resource identifier failing to match expected values for the name, the credential, and the uniform resource identifier, the determining further based on the resource list comprising the name indicative of the library linked to the expected values for the name, the credential, and the uniform resource identifier;
  in response to the library being determined as incompatible, halting, by the compiler, processing a conversion of the instruction associated with the call to the resource comprising library and generating and presenting at least one of an error and a suggestion on a user interface; and
  in response deleting or correcting the instruction via the generated and presented user interface, continuing, by the compiler, processing at least one of the conversion of the instruction or another instruction of the plurality of instructions.

12. The non-transitory computer-readable medium of claim 11, wherein the target computing service comprises a private cloud service, and wherein the library builds an application program interface call to a public server.

* * * * *